US012608607B2

(12) United States Patent
Zhou et al.

(10) Patent No.: US 12,608,607 B2
(45) Date of Patent: Apr. 21, 2026

(54) METHOD FOR PREDICTING REMAINING USEFUL LIFE OF RAILWAY TRAIN BEARING BASED ON CAN-LSTM

(71) Applicant: EAST CHINA JIAOTONG UNIVERSITY, Nanchang (CN)

(72) Inventors: Jianmin Zhou, Nanchang (CN); Sen Gao, Nanchang (CN); Hongyan Yin, Nanchang (CN)

(73) Assignee: EAST CHINA JIAOTONG UNIVERSITY, Nanchang (CN)

( * ) Notice: Subject to any disclaimer, the term of this patent is extended or adjusted under 35 U.S.C. 154(b) by 741 days.

(21) Appl. No.: 17/986,920

(22) Filed: Nov. 15, 2022

(65) Prior Publication Data

US 2023/0153608 A1 May 18, 2023

(30) Foreign Application Priority Data

Nov. 15, 2021 (CN) .......................... 202111348357.5

(51) Int. Cl.
*G06N 3/08* (2023.01)
(52) U.S. Cl.
CPC ..................................... *G06N 3/08* (2013.01)
(58) Field of Classification Search
CPC ...... G06N 3/08; G06N 3/0464; G06N 3/0442; G06N 3/048; G06N 3/0495; G06N 3/044; G06N 3/045; G06N 3/049; G06F 30/20; G06F 18/214; G06F 2119/04; G06F 2218/10
See application file for complete search history.

(56) References Cited

U.S. PATENT DOCUMENTS

2016/0304314 A1* 10/2016 Xie ........................ B66B 5/0031
2018/0150574 A1* 5/2018 Cai ......................... G06F 30/20
2019/0005069 A1* 1/2019 Filgueiras de Araujo ..................
G06V 10/757
(Continued)

FOREIGN PATENT DOCUMENTS

CN 111680454 A * 9/2020 ............. G06N 3/044
CN 112036084 A * 12/2020 .......... G01R 31/392
(Continued)

OTHER PUBLICATIONS

Yi, C., et. al. "Quantizing the Health State of Railway Axle Bearing via Signal-to-noise ratio defined by EEMD and SVD," 2018 IEEE International Conference on Prognostics and Health Management, 2018, pp. 1-7, https://ieeexplore.ieee.org/document/8448958 (Year: 2018).*

*Primary Examiner* — Cesar B Paula
*Assistant Examiner* — Harrison C Kim

(57) ABSTRACT

A method for predicting remaining useful life of railway train bearing based on CAN-LSTM aims to solve a problem that a conventional method for predicting remaining useful life of the railway train bearing lacks specific learning mechanism and affects prediction precision. Deep degradation features in channel and the temporal dimension are learned by a convolutional attention network (CAN). Then, the deep degradation features are input into a long short-term memory network (LSTM) to obtain a degradation health index, and the degradation health index is finally processed by a five-point sliding smoothing method to achieve the RUL prediction of the bearings, a prediction result of which is closer to an actual life value.

9 Claims, 8 Drawing Sheets

(56)            References Cited

U.S. PATENT DOCUMENTS

| | | | |
|---|---|---|---|
| 2019/0057307 A1* | 2/2019 | Zheng | G06N 3/044 |
| 2020/0286227 A1* | 9/2020 | Corredor | A61B 1/000096 |
| 2021/0116256 A1* | 4/2021 | Konrardy | G01C 21/362 |
| 2021/0190362 A1* | 6/2021 | Ko | G06F 18/24133 |
| 2021/0407081 A1* | 12/2021 | Bae | G06T 7/0012 |
| 2022/0004810 A1* | 1/2022 | Sinha | G06N 3/08 |

FOREIGN PATENT DOCUMENTS

| | | | | |
|---|---|---|---|---|
| CN | 113139278 A | * | 7/2021 | G06N 3/044 |
| CN | 113420691 A | * | 9/2021 | G01M 13/045 |
| CN | 113919396 B | * | 8/2024 | G06F 18/214 |
| EP | 3407267 A1 | * | 11/2018 | G06N 3/045 |

* cited by examiner

METHOD FOR PREDICTING REMAINING USEFUL LIFE OF RAILWAY TRAIN BEARING BASED ON CAN-LSTM

TECHNICAL FIELD

The present disclosure relates to a technical field of bearing detection, and in particular to a method for predicting remaining useful life of railway train bearing based on CAN-LSTM.

BACKGROUND

Prediction and health management is an efficient way for a system to improve security, integrity, and task success under actual operating conditions, and remaining useful life (RUL) prediction is the most challenging technique in the prediction and health management. In operation of modern railway trains, bearings are a key part for determining safe operation of the railway trains. Due to a fact that railway train bearings have characteristics of working under severe conditions, numerous degradation causes, and different life cycles, safety problems are caused, which further causes certain loss and influence on social economy and safety benefits. Therefore, performing real-time monitoring and RUL prediction for the health status of railway train bearings in operation have a significant meaning. In various machine learning algorithms, deep learning network model can automatically learn multi-level features from original data due to strong scalability and characterization learning capability, such machine learning algorithm is one of hot spots and key points in life prediction research algorithms of current devices.

In recent years, scholars have conducted many researches on the RUL prediction of the railway train bearings and proposed various network model structures, and a related algorithm based on convolutional neural network (CNN) has better capability of processing time series. The CNN is widely used in the RUL prediction. A basic structure of convolutional blocks of the CNN is composed of convolutional layers and pooling layers, and each of the convolutional blocks includes two convolutional layers and one pooling layer. A purpose of the convolutional blocks is to learn the multi-level features from sensor signals. For each of the convolutional layers, a series of kernel functions are configured to convolve input signals, and then a nonlinear activation function Relu is configured to perform nonlinear transformation on convolutional outputs. A CNN model adopts an effective method of local connection and weight sharing, which not only reduces a weight number and is easy to optimize the CNN model. However, the CNN model does not consider long-term dependency of temporal features.

A long short-term memory network (LSTM) is an improvement to a recurrent neural network, which includes a forward propagation network having feedforward connection and internal feedback connection. The LSTM is capable of fully utilizing information obtained from input time series data, reserving information of last moment of a hidden layer, and modeling time series of different degradation states. Currently, the LSTM is widely used in the field of the RUL prediction. Although the LSTM may obtain a long-term dependency relationship between bearing data and solve problems of gradient explosion and gradient disappearance in a RNN training process to a certain degree. However, an attention range of the LSTM on a step length of a sliding window of each hidden layer is a determined value, which may lead to a distraction problem.

Nowadays, attention mechanisms are gradually applied to the field of deep learning, and the attention mechanisms have been widely applied in terms of speech recognition, image recognition, and natural language processing. Deep learning models obtain better effects in natural language tasks, but still has many deficiencies, such as limited long-range memory capability, incapability of exact expression in a series conversion process, insufficient model dynamic structure output quality, etc., and the attention mechanisms is introduced to effectively solve the above-mentioned problems. In a term of the RUL prediction of the railway train bearings, the attention mechanism may fully integrate degradation information in a sensor, focus on the degradation information, and provide higher weights, which has significant effectiveness and superiority in improving RUL prediction accuracy. How to better integrate the attention mechanism and a new model is a key for improving the RUL prediction accuracy.

SUMMARY

The present disclosure aims at solving technical problems mentioned above and provides a method for predicting remaining useful life of railway train bearing based on CAN-LSTM.

The above technical object of the present disclosure is achieved by following technical solutions.

The present disclosure provides a method for predicting remaining useful life of railway train bearing based on CAN-LSTM, including:

constructing a degradation feature parameter set, including extracting parameters of time domain features, frequency domain features, and time-frequency domain features from bearing lifecycle vibration data, where both the time domain features and the frequency domain features comprise root mean square, kurtosis, peak-to-peak value, skewness, mean square value, and mean square error, and perform normalization processing; performing three-layer wavelet packet decomposition on vibration signals by a db5 wavelet packet to generate an energy ratio of 8 frequency subbands as time-frequency domain features; taking the time domain features, the frequency domain features, and the time-frequency domain features as a first feature sequence;

defining a degradation time point label, taking a period from a bearing degradation point to a complete failure time as remaining useful life (RUL) of bearings, standardizing a period on the RUL to [0,1], and taking the period on the RUL as a label for training a convolutional attention network (CAN) model and a long-short term memory network (LSTM) model;

$$y = \frac{i-k}{n-k-1},$$

where i is a current moment value, n is a bearing life value, and n is a degradation start moment;

CAN training, including adding attention mechanism to a convolutional neural network (CNN) to obtain the CAN model, extracting deep degradation features of a channel and a temporal attention in the vibration signals, and performing feature extraction on the first feature sequence by the CAN model to obtain a second feature sequence;

RUL prediction, including inputting the second feature sequence into a LSTM, training the LSTM, where a cyclic network structure of the LSTM is capable of processing time sequences between different degradation states, reserving a model having a minimum error in a training process, and predicting the RUL of the bearings by the model having the minimum error to obtain a feature quantization value and finally obtain a RUL predication value of the bearings; and prediction result evaluation, including smoothing the feature quantization value by a five-point sliding smoothing method for reducing influence of oscillation on the RUL predication value, obtaining the RUL predication value, and evaluating a prediction result by an evaluation function.

Furthermore, in the constructing the degradation feature parameter set, extracting an original vibration signal data feature of the bearing, constructing the degradation feature parameter set to be the first feature sequence, and dividing the degradation feature parameter set into a training set and a test set.

Furthermore, in the defining a degradation time point label, for a bearing lifecycle vibration signal, defining a moment when a vibration amplitude of the bearings is significantly increased compared to a normal standard vibration amplitude as the bearing degradation point, and beginning to predict the RUL of the bearings.

Furthermore, in the CAN training, the CAN model includes a convolutional layer, a pooling layer, an attention layer, a dropout layer, and a fully connected layer; the pooling layer is a maximum pooling layer; inputting the first feature sequence into the CNN model to generate a feature map, calculating an attention map of the feature map by the attention mechanism from a temporal dimension and a channel dimension, then multiplying the attention map and the feature map to finally obtain the second feature sequence.

Furthermore, the attention mechanism comprises channel attention and spatial attention; a construction process of the attention mechanism comprises extracting feature outputs $z^{l-1} \in R^{I \times 1 \times J}$ in second sequence features generated by the CNN model from the attention mechanism, sequentially calculating channel attention weight $\alpha^l \in R^{1 \times 1 \times J}$ and spatial attention weight $\beta^l \in R^{I \times 1 \times J}$, where 1 is a number of convolutional layers and I is a length of the feature outputs, J=N×S is a number of the feature outputs, S is a number of channels of an input sensor sequence, and a complete attention mechanism formula is as follows:

$$\tilde{z}^l = \alpha^l \otimes z^{l-1} = \Phi_c(z^{l-1}) \otimes z^{l-1},$$

$$z^l = \beta^l \otimes \tilde{z}^l = \Phi_t(\tilde{z}^l) \otimes \tilde{z}^l,$$

where $\otimes$ represents a multiplication of related elements, $\tilde{z}^l \in R^{I \times 1 \times J}$ is channel attention refinement feature outputs, $z^l \in R^{I \times 1 \times J}$ is spatial attention outputs, i.e. the second feature sequence; $\Phi_c(\cdot)$ and $\Phi_t(\cdot)$ respectively represent a channel attention function and a spatial attention function.

Furthermore, the LSTM includes an input layer, a hidden layer, a fully connected layer, and an output layer; and obtaining the RUL prediction value of the bearings based on the LSTM been trained and second sequence features.

Furthermore, when training the LSTM, adjusting an LSTM structure and LSTM hyper-parameters for improving prediction accuracy; and when adjusting the LSTM hyper-parameters, if overfitting, appropriately reducing a learning rate, reducing a number of iterations, and adding Dropout value; if underfitting, appropriately increasing the learning rate, increasing the number of the iterations, and reducing the Dropout value; and if an error of a training result is still large, adjusting the LSTM structure.

Furthermore, an activation function of an LSTM training model is rectified linear unit (ReLu).

Furthermore, in the prediction result evaluation, the evaluation function is root mean square error (RMSE) and mean absolute error (MAE).

Beneficial effects of the method for predicting remaining useful life of railway train bearing based on CAN-LSTM are as follows.

The present disclosure provides a method for predicting remaining useful life of railway train bearing based on CAN-LSTM in order to solve the problem that a conventional method for predicting the RUL of the railway train bearing lacks specific learning mechanism and affects prediction precision. The method for predicting remaining useful life of railway train bearing based on CAN-LSTM extracts the parameters of the time domain features, the frequency domain features, and the time-frequency domain features from the bearing lifecycle vibration data, and further performs the normalization processing on the parameters of the time domain feature, the frequency domain feature, and the time-frequency domain feature. Parameters of the time domain feature, the frequency domain feature, and the time-frequency domain feature after the normalization processing are taken as inputs of a convolutional attention network (CAN). The deep degradation features in the channel and the temporal dimension are learned by the CAN, thereby improving characterization capability of the deep degradation features. Then, the deep degradation features are input into the LSTM, the RUL prediction is performed on the bearing based on degradation features, and meanwhile, a health index is normalized to an interval [0,1] to obtain the same failure threshold, and finally, the prediction result is processed by the five-point sliding smoothing method to achieve the RUL prediction of the bearings. Experimental results show that the RMSEs and the MAEs of the RUL prediction value and a true value of the method of the present disclosure are small, which verifies accuracy and adaptability of the present disclosure.

DETAILED DESCRIPTION

Figure 1:
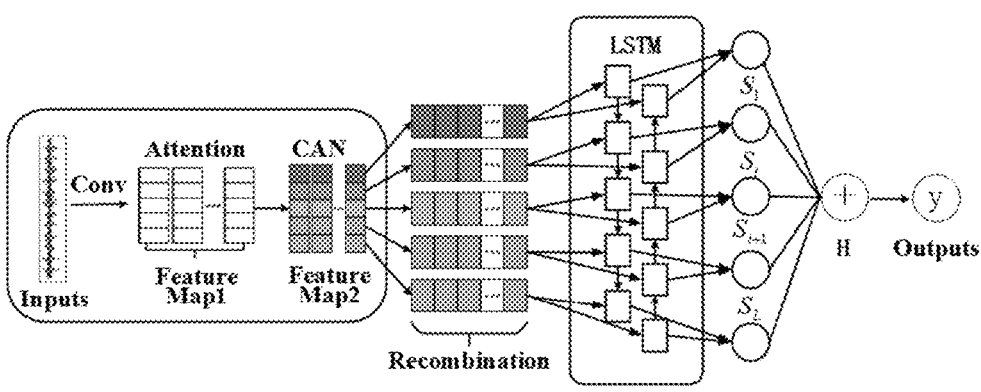
FIG. 1 is a structural schematic diagram of a prediction network based on CAN-LSTM.
Figure 2:
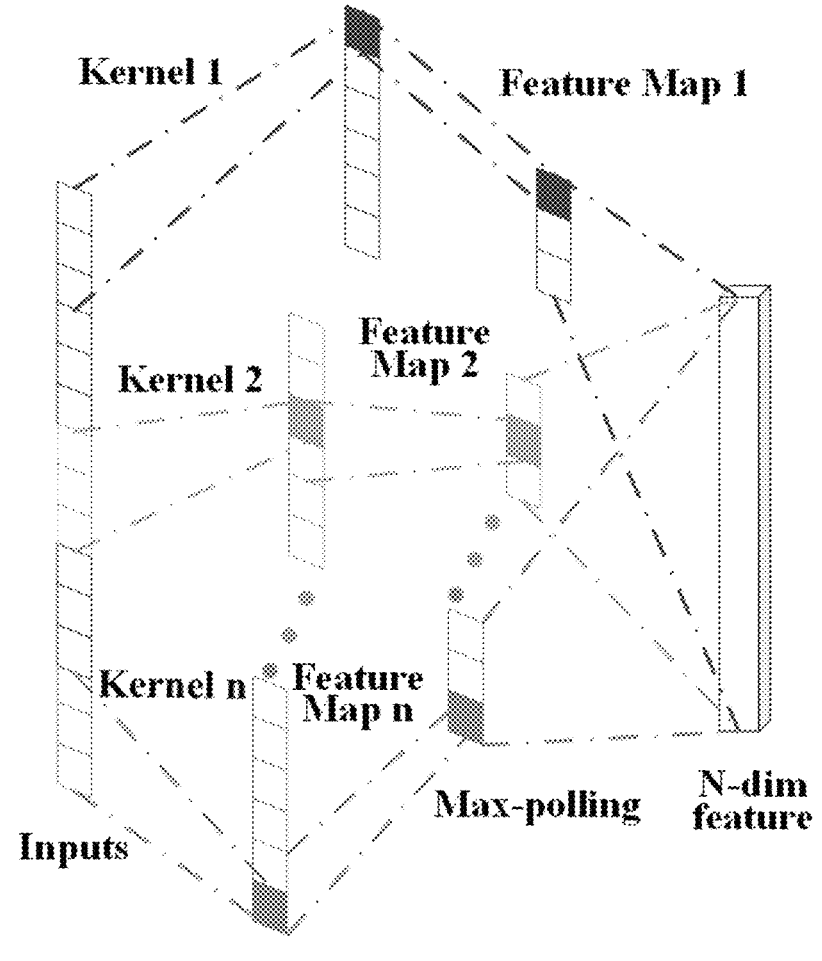
FIG. 2 is a structural schematic diagram of a one-dimensional CNN.

In the description of the present disclosure, it should be noted that the orientations or positional relationships indicated by the terms "center", "upper", "lower", "left", "right", "vertical", "horizontal", "inner", "outer" and the like are based on orientation or positional relationship shown in the drawings, and are merely intended to facilitate describing the present disclosure and simplifying the description, rather than indicating or implying that the indicated apparatus or element must have a specific orientation, be constructed and operated in a specific orientation, and therefore cannot be understood as a limitation to the present disclosure. In addition, the terms "first", "second", and "third" are used for descriptive purposes only and are not to be construed as indicating or implying relative importance.

In the description of the present disclosure, it should be noted that, unless specified or limited otherwise, the terms "disposed", "connected with", and "connected to" should be understood in a broad sense, for example, may be a fixed connection, a detachable connection, or an integral connection; may be a mechanical connection, or may be an electrical connection, may be a direct connection, may also be indirectly connected by means of an intermediate medium, or may be a communication between two elements, may be a wireless connection, or may be a wired connection. For a person of ordinary skill in the art, the specific meanings of the above terms in the present disclosure may be understood in detail.

To make objectives, technical solutions, and advantages of the present disclosure clearer, the following further describes the present disclosure in detail with reference to specific embodiments and with reference to the accompanying drawings. It should be understood that these descriptions are merely exemplary, and are not intended to limit a scope of the present disclosure. Furthermore, in the following description, descriptions of well-known structures and techniques are omitted to avoid unnecessarily obscuring the concepts of the present disclosure.

With reference to FIGS. 1-14, implementation and experimental results of the present disclosure are as follows.

1. Proposal and Evolution of Remaining Useful Life (RUL) Prediction Model of Bearings Based on CAN-LSTM A model provided by the present disclosure consists of a feature learning network CAN and a prediction network LSTM. The structural schematic diagram of the CAN-LSTM is shown in FIG. 1, in the CAN-LSTM, original features of vibration signals collected by different sensors are taken as inputs to integrate degradation information of multiple features. Then, a feature learning sub-network is constructed by attention mechanism and convolutional network learning, and feature information is found and highlighted from the input vibration signals. Finally, learned features are fed back to the LSTM to perform RUL prediction of bearings. Detailed information of the CAN-LSTM is described as follows.

A CAN model is composed of a CNN and a self-attention module. A convolutional neural network more abstractly and profoundly expresses original bearing signals in a form of a convolutional operation. The structure of a one-dimensional CNN is shown in FIG. 1. A basic structure of convolutional blocks of the CNN is composed of convolutional layers and pooling layers, and each of the convolutional blocks includes two convolutional layers and one pooling layer. A purpose of the convolutional blocks is to learn multi-level features from sensor signals. For each of the convolutional layers, a series of kernel functions are configured to convolve input signals, and then rectified linear unit (ReLu) is configured to perform nonlinear transformation on convolutional outputs. Through the foregoing two steps, different features maps may be obtained in the convolutional layers.

Figure 3:
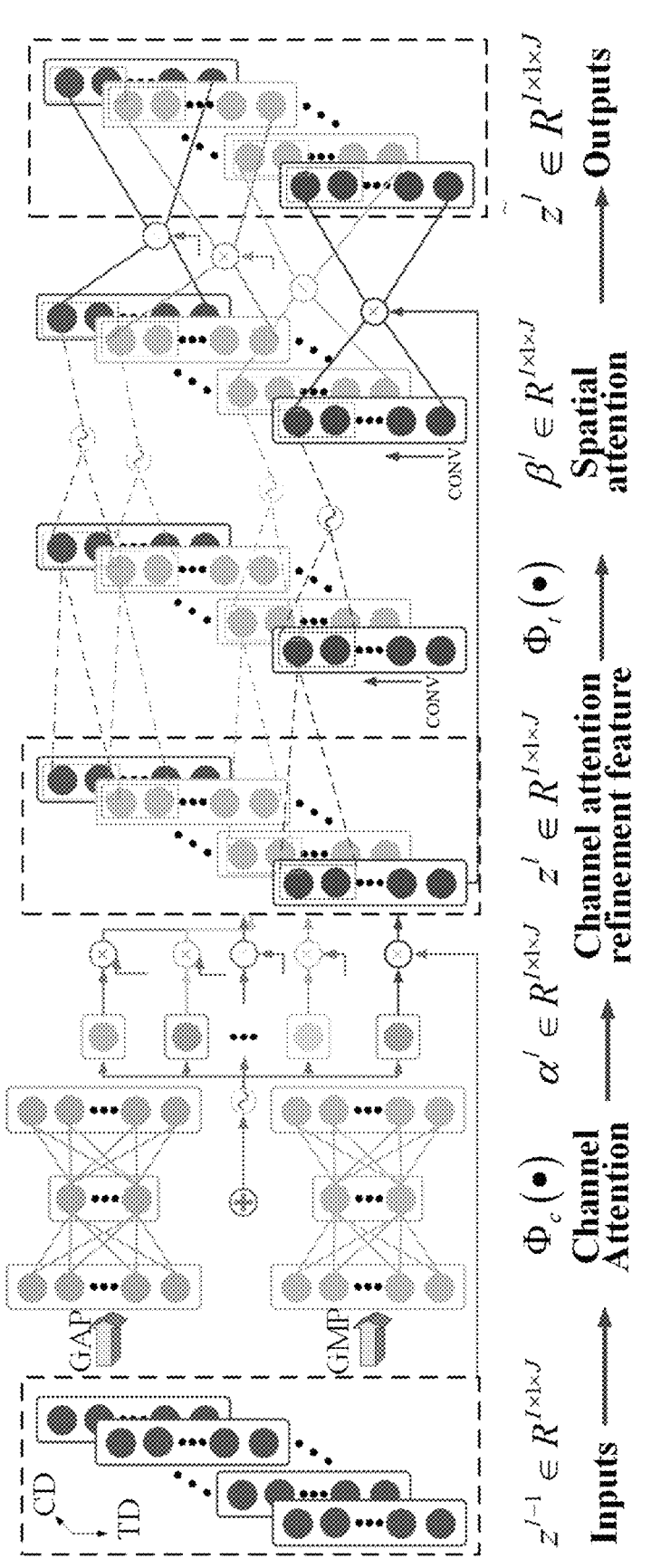
FIG. 3 is a structural schematic diagram of an attention mechanism.

As show in FIG. 3, an attention module includes channel attention and spatial attention. Two attention mechanisms of the channel attention and the spatial attention enable a deep learning module to effectively learn features in a channel dimension and a time dimension, which effectively improves characterization capability of network modules.

The attention module extracts feature outputs $z^{l-1} \in R^{I \times 1 \times J}$ from different sensor sequences, channel attention weight $\alpha^l \in R^{1 \times 1 \times J}$ and spatial attention weight $\beta^l \in R^{I \times 1 \times J}$ are sequentially calculated from the attention module, where I is a length of the feature outputs, $J = N \times S$ is a number of the feature outputs, S is a number of channels of an input sensor sequence, and a complete attention mechanism formula is as follows:

$$\tilde{z}^l = \alpha^l \otimes z^{l-1} = \Phi_c(z^{l-1}) \otimes z^{l-1} \tag{1}$$

$$z^l = \beta^l \otimes \tilde{z}^l = \Phi_t(\tilde{z}^l) \otimes \tilde{z}^l \tag{2}$$

where $\otimes$ represents a multiplication of related elements, $\tilde{z}^l \in R^{I \times 1 \times J}$ is channel attention refinement feature outputs, $z^l \in R^{I \times 1 \times J}$ is spatial attention outputs, i.e. the second feature sequence; $\Phi_c(\cdot)$ and $\Phi_t(\cdot)$ respectively represent a channel attention function and a spatial attention function.

Figure 4:
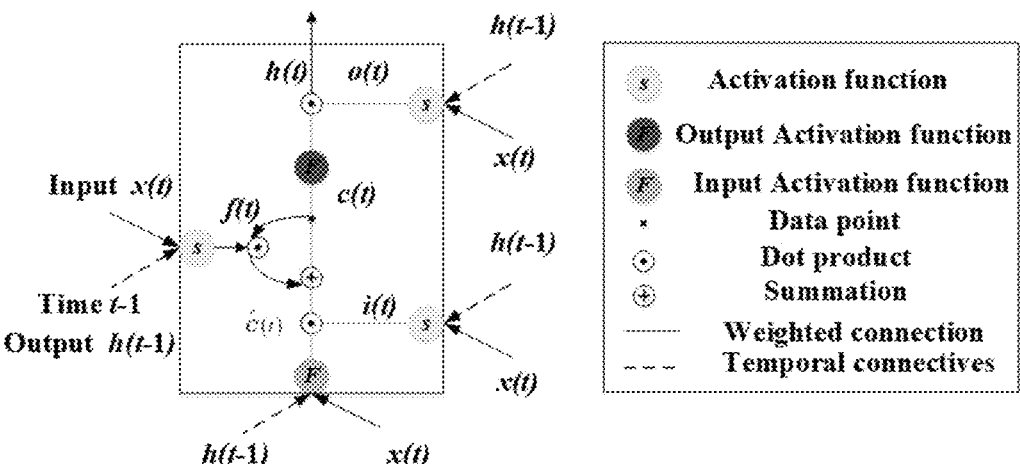
FIG. 4 is a structural schematic diagram of an LSTM model.

As a structure of an LSTM network shown in FIG. 4, the LSTM network is an improvement to a recurrent neural network. Outputs of the LSTM network are not only dependent on current inputs, but also dependent on all past input information. Thereby, the LSTM network may fully use information from input time series data, and time series having different degradation states is modeled.

In an actual training process, the LSTM may effectively alleviate problems of vanishing gradient or explosion and obtain time dependence between data. The LSTM includes an input gate, a forget gate, and an output gate, and specific formulas are as follows:

$$\hat{c}_t = \tanh(W_{xc}x_t + W_{hc}h_{t-1} + b_c) \tag{3}$$

$$i_t = \sigma(W_{xi}x_t + W_{hi}h_{t-1} + b_i) \tag{4}$$

$$f_t = \sigma(W_{xf}x_t + W_{hf}h_{t-1} + b_f) \tag{5}$$

$$c_t = f_t \otimes c_{t-1} + i_t \otimes \hat{c}_t \tag{6}$$

$$o_t = \sigma(W_{xo}x_t + W_{ho}h_{t-1} + b_o) \tag{7}$$

$$h_t = o_t \circ \tanh(c_t) \tag{8}$$

7                                           8

In the formulas, $i_t$, $f_t$, and $o_t$ respectively represent values of the input gate, the forget gate, and the output gate; $W_{xc}$, $W_{xi}$, $W_{xf}$, and $W_{xo}$ respectively represent convolution kernels in a memory unit, an input gate, a forget gate, and an output gate between an input layer and a hidden layer at a t moment; $W_{hc}$, $W_{hi}$, $W_{hf}$, $W_{ho}$ respectively represent convolution kernels in the memory unit, the input gate, the forget gate, and the output gate between the input layer and the hidden layer at a t−1 moment; $b_c$, $b_i$, $b_f$, and $b_o$ are deviation terms; h and c represent an external unit and a memory state; ○ represents a Hadamard product; and σ(·) is a Logistic Sigmoid function.

2. Method and Process for Predicting a RUL of Railway Train Bearings

Figure 5:
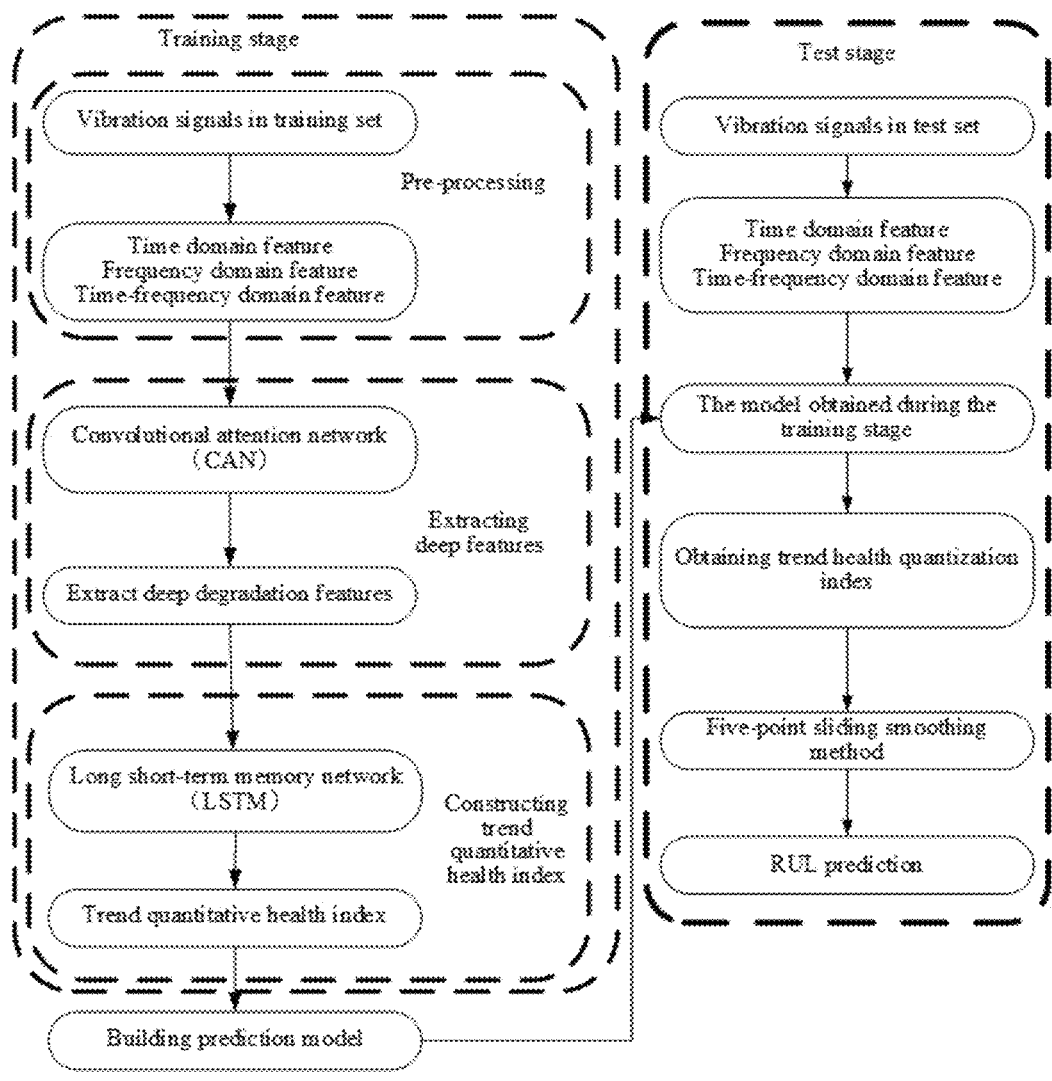
FIG. 5 is a systematic flowchart of a RUL prediction method of rolling bearings according to the present disclosure.

As shown in FIG. 5, the method and process specifically include following steps:

step 1: constructing degradation feature parameter set, including extracting parameters of time domain features, frequency domain features, and time-frequency domain features from bearing lifecycle vibration data, where both the time domain features and the frequency domain features include root mean square, kurtosis, peak-to-peak value, skewness, mean square value, and mean square error, and perform normalization processing; performing three-layer wavelet packet decomposition on vibration signals by a db5 wavelet packet to generate an energy ratio of 8 frequency subbands as the time-frequency domain features; taking the time domain features, the frequency domain features, and the time-frequency domain features as a first feature sequence;

step 2: defining a degradation time point label, taking a period from a bearing degradation point to a complete failure time as remaining useful life (RUL) of bearings, standardizing a period on the RUL to [0,1], and taking the period on the RUL as a label for training convolutional attention network (CAN) model and a long short-term memory network (LSTM) model;

$$ y = \frac{i-k}{n-k-1} \qquad (9) $$

where i is a current moment value, n is a bearing life value, and k is the degradation start moment;

step 3: CAN training, including adding attention mechanism to a convolutional neural network (CNN) to obtain the CAN model, mining deep degradation features of channel and temporal dimension in the vibration signals, and performing feature extraction on the first feature sequence by the CAN model to obtain the second feature sequence;

step 4: RUL prediction, including inputting the second feature sequence into a LSTM, training the LSTM, where a cyclic network structure of the LSTM is capable of processing time sequences between different degradation states, reserving a model having a minimum error in a training process, and predicting the RUL of the bearings by the model having the minimum error to obtain a feature quantization value and finally obtain a RUL predication value of the bearings; and step 5: prediction result evaluation, including smoothing the feature quantization value by a five-point sliding smoothing method for reducing influence of oscillation on the RUL predication value, obtaining the RUL predication value, and evaluating a prediction result by an evaluation function.

3. Experimental Validation

To evaluate performance of the model, the model for evaluating bearing life is verified and analyzed by bearing data. The bearing data for the experimental validation is derived from a XJTU-SY bearing data set.

Experiment starts at a fixed speed condition and performs an accelerated degradation test of bearings of rolling elements under different operating conditions. When amplitude of vibration signals in one direction exceeds 10×$A_h$, the bearings are determined to have failed, and related life experiment is further stopped. $A_h$ is maximum vibration amplitude of the vibration signals in the one direction under normal operation. In an experiment process, the bearings may have any type of fault (inner ring, outer ring, ball, or cage). A type of the bearing for test is LDK UER204. Acceleration signals are collected in sliding windows, duration of which is 1.28 seconds, collecting the acceleration signals is repeated once every 1 minute, and sampling frequency is 25.6 Hz.

Each working condition includes five bearings, which are respectively named from Bearing1_1 to Bearing1_5, Bearing2_1 to Bearing2_5, and Bearing3_1 to Bearing3_5, where the present disclosure collects one set of bearing data in each working condition to be a test set, and the rest data is a training set.

The time domain features and the frequency domain features, each including eleven features of root mean square, kurtosis, peak-to-peak value, skewness, etc., in the bearing lifecycle vibration data are extracted. The three-layer wavelet packet decomposition is performed on the vibration signals by the db5 wavelet packet to generate the energy ratio of the 8 frequency subbands as the time-frequency domain feature. The extracted time domain features, frequency domain features, and time-frequency domain features are taken as a fault feature parameter set, and are further input into the CAN model for training.

Figure 6:
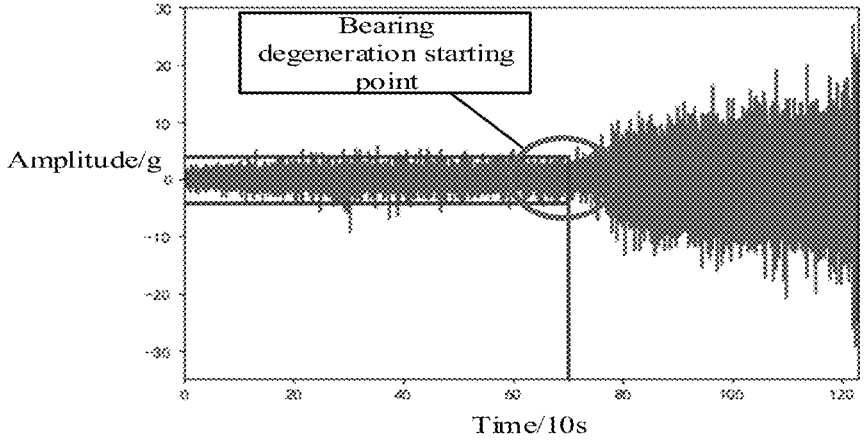
FIG. 6 is a schematic diagram of a bearing lifecycle vibration signal of Bearing1_1.
Figure 7:
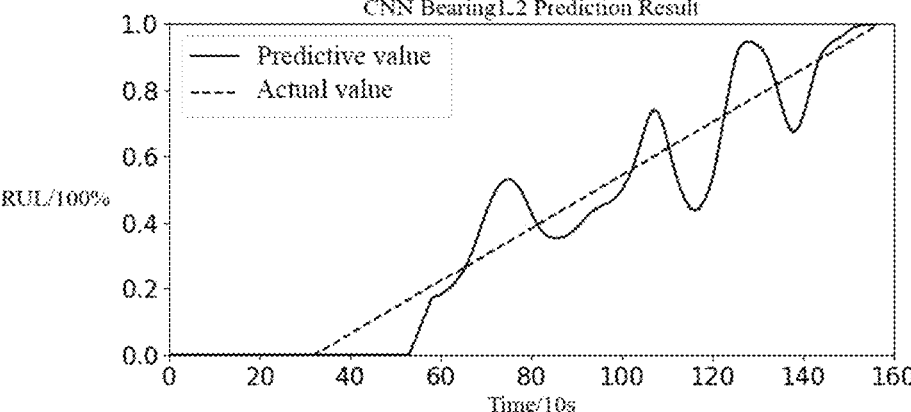
FIG. 7 is a schematic diagram of a RUL prediction result for Bearing1_2 of a CNN.
Figure 8:
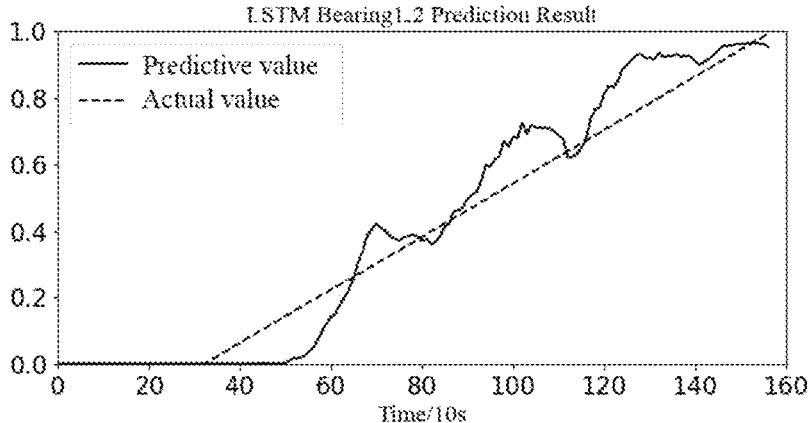
FIG. 8 is a schematic diagram of a RUL prediction result for the Bearing1_2 of a LSTM.
Figure 9:
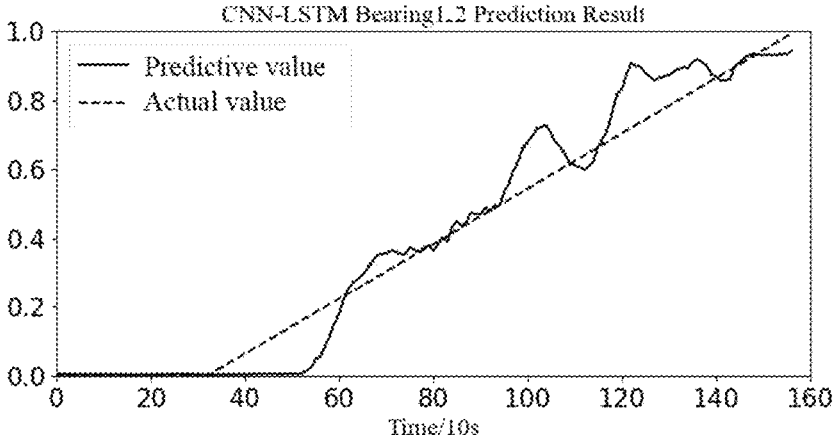
FIG. 9 is a schematic diagram of a RUL prediction result for the Bearing1_2 of a CNN-LSTM.
Figure 10:
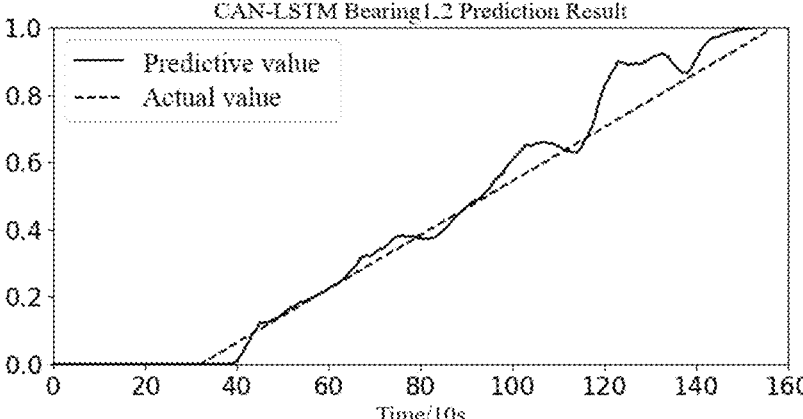
FIG. 10 is a schematic diagram of a RUL prediction result for the Bearing1_2 of the CNN-LSTM.
Figure 11:
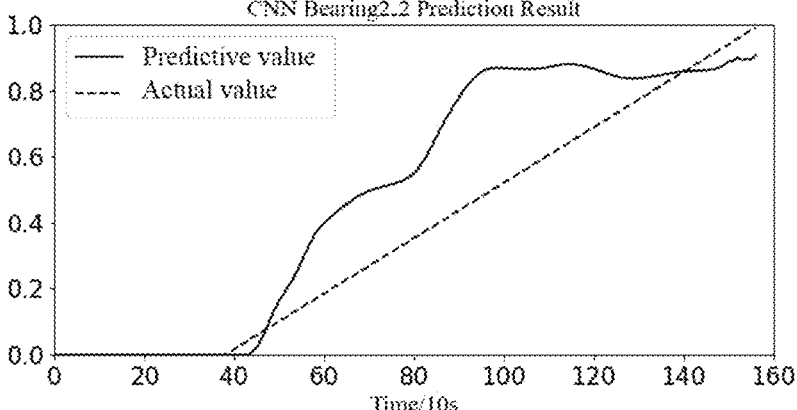
FIG. 11 is a schematic diagram of a RUL prediction result for a Bearing2_2 of the CNN.
Figure 12:
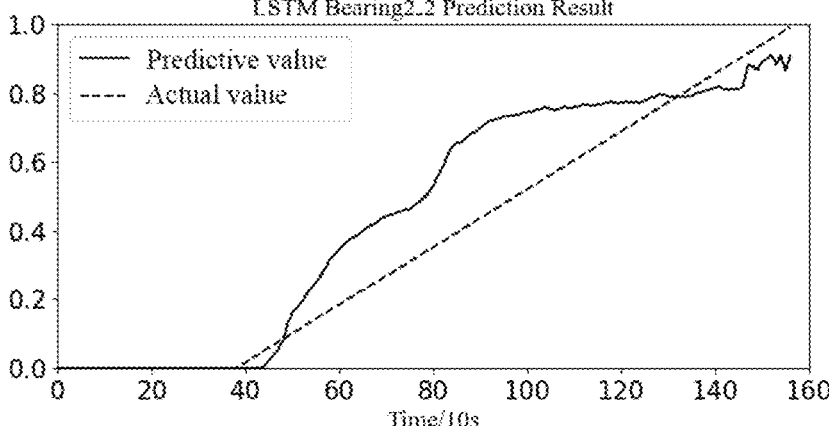
FIG. 12 is a schematic diagram of a RUL prediction result for the Bearing2_2 of the LSTM.
Figure 13:
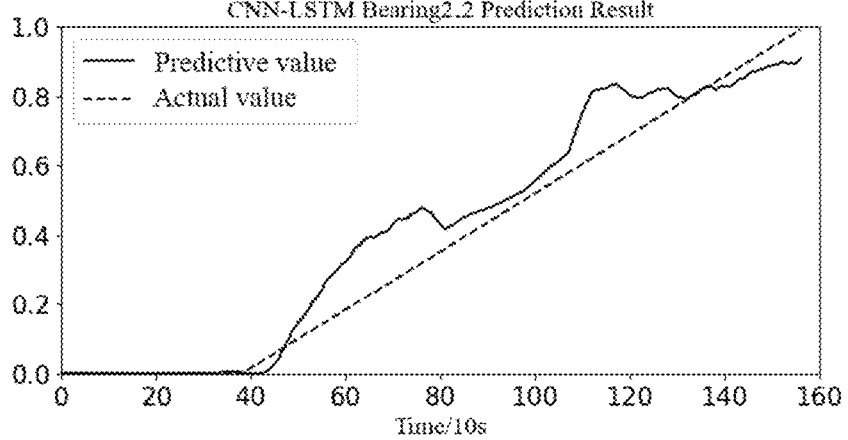
FIG. 13 is a schematic diagram of a RUL prediction result for the Bearing2_2 of the CNN-LSTM.
Figure 14:
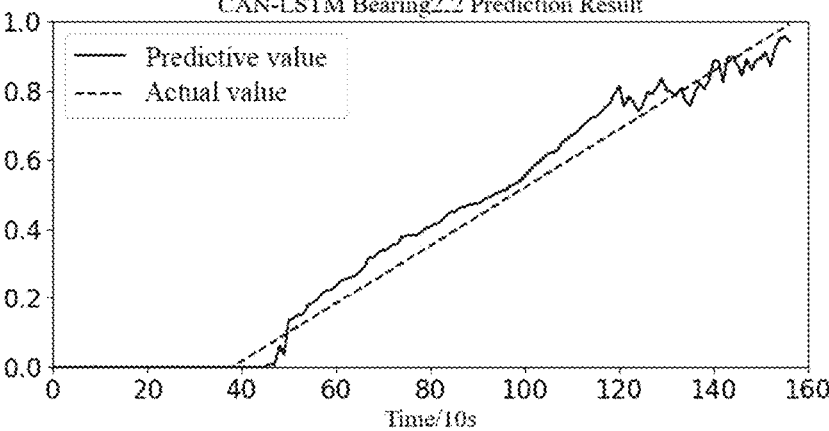
FIG. 14 is a schematic diagram of a RUL prediction result for the Bearing2_2 of the CAN-LSTM.
Figure 15:
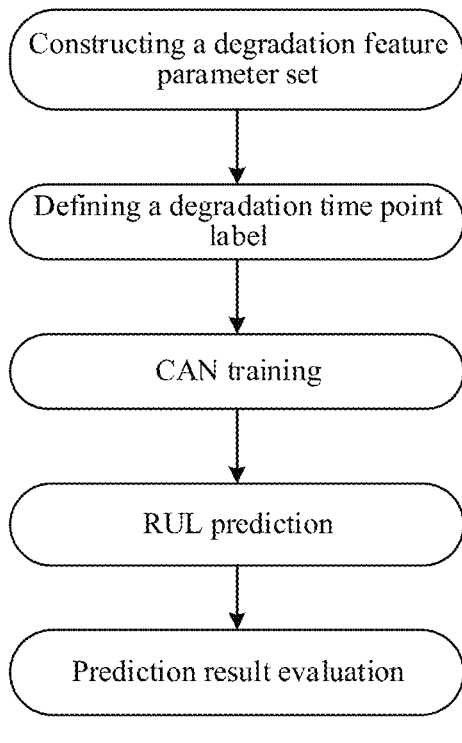
FIG. 15 is a step schematic diagram of a method for predicting RUL of railway train bearing based on CAN-LSTM.

As shown in FIG. 6, a method for determining a bearing fault starting point is as follows. For the bearing lifecycle vibration signal, defining a moment when the vibration amplitude of the bearings is significantly increased compared to the normal standard vibration amplitude as the bearing degradation starting point, and beginning to predict the RUL of the bearings. For each experimental sample ($X_i$, $Y_i$), $X_i$ is taken as the feature input and is the vibration acceleration value collected for i-th time. $Y_i$ is taken as a label and is a ratio of time difference between current moment and failure moment and time interval between degradation start moment and the failure moment (normalization is between 0 and 1).

4. RUL Prediction

For a conventional regression problem, a number of last output layer nodes of the CAN-LSTM is 1, and an output value of the CAN-LSTM is a prediction value of the model. In order to verify accuracy of the method for predicting the RUL, the accuracy of the prediction result is evaluated by root mean square error (RMSE) and mean absolute error (MAE), which is specifically defined as follows:

$$ RMSE = \sqrt{\frac{1}{n}\sum_{t=1}^{n}(A_t - F_t)^2} \qquad (10) $$

-continued $$MAE = \frac{1}{n}\sum_{t=1}^{n}|A_t - F_t|^2 \qquad (11)$$

where $A_t$ is a true value of time t, $F_t$ is a prediction value of the time t.

In the RUL prediction, CAN-LSTM hyper-parameters are adjusted and selected by performing cross validation on the training sets, and finally hyper-parameters for the model are selected. The model includes five convolutional attention layers, five pooling layers, and three LSTM layers. At the same time, both a discard layer and L2 regularization are applied to each of the five convolutional attention layers and each of the five pooling layers to prevent the created model from overfitting with training data. The RMSE and the MAE are configured to serve as loss evaluating functions, Adam serves as an optimizer, and network weights are optimized in an iterative updating mode.

Label values of the training set are between 0 and 1, thereby avoiding influence of uncertainty of failure thresholds on the prediction result.

5. Comparison Between Different Model Prediction Results

A CAN-LSTM model is mainly composed of a CAN and the LSTM network, and in order to verify validity of the CAN-LSTM model, the CAN-LSTM model is compared with the CNN model, the LSTM model, and a CNN-LSTM model. Taking two bearings of Bearing1_2 and Bearing2_2 as an example, RUL prediction is performed by the above four models. RUL prediction values of the Bearing1_2 are shown in FIGS. 7-10, and RUL prediction values of the Bearing2_2 are shown in FIGS. 11-14. The abscissa in the figures represents a sampling period (10 s), the ordinate represents a trend health quantization index, the solid line represents prediction values after fitting, and the broken lines represent true values.

According to prediction value results obtained in the figures, compared with other three models, it can be seen that the CAN-LSTM model may provide more accurate RUL prediction results and stable prediction effects, the RUL prediction results of the CAN-LSTM model are close to an actual RUL. Since the LSTM model and the CNN-LSTM model do not effectively integrate multi-sensor degradation information, the CNN model does not consider long-term dependence of the time sequence features, and the extracted CAN-LSTM model has capability of integrating the multi-sensor degradation information and the capability of mining continuous time sequence features, so that the extracted time sequence features may effectively reduce prediction errors.

In order to more comprehensively verify accuracy and adaptability of the model provided by the present disclosure, prediction and verification are performed by Leave-One-Out (LOO). One bearing under each working condition is selected for each time as a test set, remaining bearings under the same working condition are taken as a training set, and the four models are first trained and then RUL predictions are performed on the one bearing under each working condition selected as test set. The RUL predicted values are shown in Table 1, and the results include the RMSE and MAE of the prediction values and the true values of the four models.

Table 1 Showing Experimental Result of the LOO

| Bearings for test | Evaluation indicator | CNN | LSTM | CNN-LSTM | CAN-LSTM |
|---|---|---|---|---|---|
| Bearing1_1 | RMSE | 0.211 | 0.102 | 0.081 | 0.067 |
| | MAE | 0.106 | 0.068 | 0.045 | 0.037 |
| Bearing1_2 | RMSE | 0.094 | 0.079 | 0.069 | 0.052 |
| | MAE | 0.069 | 0.059 | 0.048 | 0.033 |
| Bearing1_3 | RMSE | 0.299 | 0.154 | 0.094 | 0.071 |
| | MAE | 0.201 | 0.095 | 0.081 | 0.064 |
| Bearing1_4 | RMSE | 0.105 | 0.107 | 0.081 | 0.048 |
| | MAE | 0.079 | 0.079 | 0.054 | 0.025 |
| Bearing1_5 | RMSE | 0.221 | 0.213 | 0.177 | 0.155 |
| | MAE | 0.134 | 0.133 | 0.105 | 0.090 |
| Bearing2_1 | RMSE | 0.112 | 0.092 | 0.081 | 0.067 |
| | MAE | 0.041 | 0.034 | 0.024 | 0.017 |
| Bearing2_2 | RMSE | 0.174 | 0.123 | 0.082 | 0.046 |
| | MAE | 0.125 | 0.093 | 0.059 | 0.036 |
| Bearing2_3 | RMSE | 0.146 | 0.125 | 0.094 | 0.081 |
| | MAE | 0.127 | 0.070 | 0.061 | 0.053 |
| Bearing2_4 | RMSE | 0.153 | 0.131 | 0.081 | 0.067 |
| | MAE | 0.084 | 0.070 | 0.046 | 0.034 |
| Bearing2_5 | RMSE | 0.237 | 0.184 | 0.105 | 0.087 |
| | MAE | 0.172 | 0.131 | 0.097 | 0.076 |
| Bearing3_1 | RMSE | 0.139 | 0.100 | 0.099 | 0.085 |
| | MAE | 0.026 | 0.021 | 0.020 | 0.014 |
| Bearing3_2 | RMSE | 0.284 | 0.247 | 0.200 | 0.149 |
| | MAE | 0.187 | 0.140 | 0.109 | 0.067 |
| Bearing3_3 | RMSE | 0.084 | 0.050 | 0.047 | 0.044 |
| | MAE | 0.039 | 0.019 | 0.017 | 0.012 |
| Bearing3_4 | RMSE | 0.067 | 0.050 | 0.048 | 0.044 |
| | MAE | 0.021 | 0.014 | 0.013 | 0.012 |
| Bearing3_5 | RMSE | 0.221 | 0.168 | 0.135 | 0.119 |
| | MAE | 0.169 | 0.117 | 0.095 | 0.080 |
| Mean | RMSE | 0.170 | 0.128 | 0.098 | 0.078 |
| | MAE | 0.105 | 0.076 | 0.058 | 0.043 |

As shown in the table 1, the RUL prediction value of the CAN-LSTM model has better prediction accuracy with respect to other three models. Both the RMSE and the MAE are less than the other three models. A mean value of the RMSE and the MAE of each model in Table 1 is calculated to obtain a comprehensive RMSE and a comprehensive MAE of the four models. The comprehensive RMSE and the comprehensive MAE of the CAN-LSTM model are 54.12% and 59.05% lower than the comprehensive RMSE and the comprehensive MAE of the CNN model, 39.06% and 43.42% lower than the comprehensive RMSE and the comprehensive MAE of the LSTM model, and 20.41% and 25.86% lower than the comprehensive RMSE and the comprehensive MAE of the CNN-LSTM model, which certifies that the CAN-LSTM model has good adaptability under different working conditions.

It should be understood that the foregoing specific embodiments of the present disclosure are merely illustrative or explanatory of the principles of the present disclosure, and do not constitute a limitation on the present disclosure. Therefore, any modifications, equivalent substitutions, improvements, etc. made without departing from the spirit and scope of the present disclosure shall fall within the protection scope of the present disclosure. Furthermore, the appended claims are intended to cover all changes and modifications that fall within the scope and boundaries of the appended claims, or equivalents of such ranges and boundaries.

What is claimed is:

1. A method for predicting remaining useful life of railway train bearings based on a convolutional attention network and a long short-term memory network (CAN-LSTM), comprising:

constructing a degradation feature parameter set, comprising extracting parameters of time domain features, frequency domain features, and time-frequency domain features from bearing lifecycle vibration data, where both the time domain features and the frequency domain features comprise root mean square, kurtosis, peak-to-peak value, skewness, mean square value, and mean square error, and perform normalization processing; performing three-layer wavelet packet decomposition on vibration signals by a db5 wavelet packet to generate an energy ratio of 8 frequency subbands as the time-frequency domain feature; taking the time domain features, the frequency domain features, and the time-frequency domain features as a first feature sequence;

defining a degradation time point label, taking a period from a bearing degradation point to a complete failure time as remaining useful life (RUL) of bearings, standardizing a period on the RUL to [0,1], and taking the period on the RUL as a label for training a convolutional attention network (CAN) model and a long short-term memory network (LSTM) model;

$$y = \frac{i-k}{n-k-1},$$

where i is a current moment value, n is a bearing life value, and k is a degradation start moment;

CAN training, comprising adding attention mechanism to a convolutional neural network (CNN) to obtain the CAN model, extracting deep degradation features of a channel and a temporal attention in the vibration signals, and performing feature extraction on the first feature sequence by the CAN model to obtain a second feature sequence;

RUL prediction, comprising inputting the second feature sequence into a LSTM, training the LSTM, where a cyclic network structure of the LSTM is capable of processing time sequences between different degradation states, reserving a model having a minimum error in a training process, and predicting the RUL of the bearings by the model having the minimum error to obtain a feature quantization value and finally obtain a RUL prediction value of the bearings; and prediction result evaluation, comprising smoothing the feature quantization value by a five-point sliding smoothing method for reducing influence of oscillation on the RUL prediction value, obtaining the RUL prediction value, and evaluating prediction results by an evaluation function; and predicting remaining useful life of railway train bearings based on CAN-LSTM in order to solve the problem that a conventional method for predicting the RUL of the railway train bearings lacks specific learning mechanism and affects prediction precision.

2. The method for predicting remaining useful life of railway train bearings based on CAN-LSTM according to claim 1, wherein in the constructing the degradation feature parameter set, extracting an original vibration signal data feature of the bearings, constructing the degradation feature parameter set to be the first feature sequence, and dividing the degradation feature parameter set into a training set and a test set.

3. The method for predicting remaining useful life of railway train bearings based on CAN-LSTM according to claim 1, wherein in the defining the degradation time point label, for a bearing lifecycle vibration signal, defining a moment when a vibration amplitude of the bearings is significantly increased compared to a normal standard vibration amplitude as the bearing degradation point, and beginning to predict the RUL of the bearings.

4. The method for predicting remaining useful life of railway train bearings based on CAN-LSTM according to claim 1, wherein in the CAN training, the CAN model comprises a convolutional layer, a pooling layer, an attention layer, a dropout layer, and a fully connected layer; the pooling layer is a maximum pooling layer; inputting the first feature sequence into the CNN model to generate a feature map, calculating an attention map of the feature map by the attention mechanism from a temporal dimension and a channel dimension, then multiplying the attention map and the feature map to finally obtain the second feature sequence.

5. The method for predicting remaining useful life of railway train bearings based on CAN-LSTM according to claim 4, wherein the attention mechanism comprises channel attention and spatial attention; a construction process of the attention mechanism comprises extracting feature outputs $z^{l-1} \in R^{I \times 1 \times J}$ in second sequence features generated by the CNN model from the attention mechanism, sequentially calculating channel attention weight $\alpha^l \in R^{I \times 1 \times J}$ and spatial attention weight $\beta^l \in R^{I \times 1 \times J}$, where l is a number of convolutional layers and I is a length of the feature outputs, $J=N \times S$ is a number of the feature outputs, S is a number of channels of an input sensor sequence, and a complete attention mechanism formula is as follows:

$$\tilde{z}^l = \alpha^l \otimes z^{l-1} = \Phi_c(z^{l-1}) \otimes z^{l-1},$$

$$z^l = \beta^l \otimes \tilde{z}^l = \Phi_t(\tilde{z}^l) \otimes \tilde{z}^l,$$

where $\otimes$ represents a multiplication of related elements, $\tilde{z}^l \in R^{I \times 1 \times J}$ is channel attention refinement feature outputs, $z^l \in R^{I \times 1 \times J}$ is spatial attention outputs, i.e. the second feature sequence; $\Phi_c(\cdot)$ and $\Phi_t(\cdot)$ respectively represent a channel attention function and a spatial attention function.

6. The method for predicting remaining useful life of railway train bearings based on CAN-LSTM according to claim 1, wherein the LSTM comprises an input layer, a hidden layer, a fully connected layer, and an output layer; and obtaining the RUL prediction value of the bearings based on the trained LSTM and second sequence features.

7. The method for predicting remaining useful life of railway train bearings based on CAN-LSTM according to claim 6, wherein when training the LSTM, adjusting an LSTM structure and LSTM hyper-parameters for improving prediction accuracy; and when adjusting the LSTM hyper-parameters, if overfitting, appropriately reducing a learning rate, reducing a number of iterations, and adding Dropout value; if underfitting, appropriately increasing the learning rate, increasing the number of the iterations, and reducing the Dropout value; and if an error of a training result is still large, adjusting the LSTM structure.

8. The method for predicting remaining useful life of railway train bearings based on CAN-LSTM according to claim 7, wherein an activation function of an LSTM training model is rectified linear unit (ReLu).

9. The method for predicting remaining useful life of railway train bearings based on CAN-LSTM according to claim 4, wherein in the prediction result evaluation, the evaluation function is root mean square error (RMSE) and mean absolute error (MAE).

\* \* \* \* \*